US012763248B2

(12) United States Patent
Bae et al.

(10) Patent No.: US 12,763,248 B2
(45) Date of Patent: Oct. 13, 2026

(54) MAGNETIC ELEMENT AND IMAGE OUTPUT DEVICE COMPRISING SAME

(71) Applicant: LG INNOTEK CO., LTD., Seoul (KR)

(72) Inventors: Seok Bae, Seoul (KR); Sun Young Yu, Seoul (KR); Jung Eun Lee, Seoul (KR); In Seong Sohn, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 722 days.

(21) Appl. No.: 18/033,014

(22) PCT Filed: Oct. 21, 2021

(86) PCT No.: PCT/KR2021/014814

§ 371 (c)(1),
(2) Date: Apr. 20, 2023

(87) PCT Pub. No.: WO2022/086220

PCT Pub. Date: Apr. 28, 2022

(65) Prior Publication Data

US 2023/0395304 A1 Dec. 7, 2023

(30) Foreign Application Priority Data

Oct. 21, 2020 (KR) ........................ 10-2020-0136784
Oct. 21, 2020 (KR) ........................ 10-2020-0136785
(Continued)

(51) Int. Cl.
*H01F 27/28* (2006.01)
*H01F 27/26* (2006.01)
(Continued)

(52) U.S. Cl.
CPC ......... *H01F 27/2823* (2013.01); *H01F 27/26* (2013.01); *H01F 27/29* (2013.01); *H01F 27/325* (2013.01)

(58) Field of Classification Search
CPC ...... H01F 27/2823; H01F 27/26; H01F 27/29; H01F 27/325; H01F 27/2828; H01F 27/2871; H01F 27/306
(Continued)

(56) References Cited

U.S. PATENT DOCUMENTS 6,636,140 B2 10/2003 Fujiyoshi et al.
7,982,576 B2 7/2011 Feng et al.
(Continued)

FOREIGN PATENT DOCUMENTS

JP 2-7406 A 1/1990
JP 2-60214 U 5/1990
(Continued)

*Primary Examiner* — Shawki S Ismail
*Assistant Examiner* — Kazi S Hossain
(74) *Attorney, Agent, or Firm* — Birch, Stewart, Kolasch & Birch, LLP

(57) ABSTRACT

A magnetic element according to an embodiment of the present invention a first core, a second core, a bobbin including a through-hole, the bobbin being at least partially disposed between the first core and the second core, a first coil unit and a second coil unit at least partially disposed on the bobbin, wherein at least one of the first coil unit or the second coil unit includes a plurality of conductive wires disposed around the through-hole, wherein the bobbin includes a first portion formed to allow the first end portion and the second end portion of each of the plurality of conductive wires to be disposed thereon and a second portion formed opposite the first portion in a horizontal direction, with the through-hole interposed therebetween, and wherein portions of the plurality of conductive wires overlap each other vertically on the second portion.

19 Claims, 12 Drawing Sheets

(30) Foreign Application Priority Data

| | | |
|---|---|---|
| Oct. 21, 2020 | (KR) | 10-2020-0136788 |
| Oct. 19, 2021 | (KR) | 10-2021-0139407 |

(51) Int. Cl.
*H01F 27/29* (2006.01)
*H01F 27/32* (2006.01)

(58) Field of Classification Search
USPC .................................. 336/212, 221, 83, 180
See application file for complete search history.

(56) References Cited

U.S. PATENT DOCUMENTS

| | | | | |
|---|---|---|---|---|
| 10,163,554 | B2 | 12/2018 | Eom et al. | |
| 2007/0273465 | A1* | 11/2007 | Feng | H01F 27/2866 336/212 |
| 2011/0227688 | A1 | 9/2011 | Park et al. | |
| 2012/0001714 | A1* | 1/2012 | Shin | H01F 27/325 336/198 |
| 2012/0002387 | A1* | 1/2012 | Park | H05B 41/02 361/679.01 |
| 2014/0125442 | A1* | 5/2014 | Cheon | H01F 27/29 336/192 |
| 2015/0116068 | A1* | 4/2015 | Kwon | H01F 27/325 336/192 |
| 2016/0111201 | A1 | 4/2016 | Huang et al. | |
| 2020/0090856 | A1 | 3/2020 | Assis et al. | |

FOREIGN PATENT DOCUMENTS

| | | | |
|---|---|---|---|
| JP | 5-93010 | U | 12/1993 |
| JP | 5-95026 | U | 12/1993 |
| JP | 9-232167 | A | 9/1997 |
| JP | 2000-173840 | A | 6/2000 |
| JP | 2005-534218 | A | 11/2005 |
| JP | 2011-530177 | A | 12/2011 |
| JP | 2013-168401 | A | 8/2013 |
| JP | 2014-53453 | A | 3/2014 |
| JP | 2015-188033 | A | 10/2015 |
| KR | 2002-0045521 | A | 6/2002 |
| KR | 10-2011-0106028 | A | 9/2011 |
| KR | 10-1153515 | B1 | 6/2012 |
| KR | 10-2012-0076299 | A | 7/2012 |
| KR | 10-1241539 | B1 | 3/2013 |
| KR | 10-1360707 | B1 | 2/2014 |
| KR | 10-2015-0026761 | A | 3/2015 |
| KR | 10-1686975 | B1 | 1/2017 |
| KR | 10-2019-0088771 | A | 7/2019 |
| KR | 10-2020-0014834 | A | 2/2020 |

* cited by examiner

MAGNETIC ELEMENT AND IMAGE OUTPUT DEVICE COMPRISING SAME

CROSS REFERENCE TO RELATED APPLICATIONS

This application is the National Phase of PCT International Application No. PCT/KR2021/014814, filed on Oct. 21, 2021, which claims priority under 35 U.S.C. § 119 (a) to Patent Application Nos. 10-2020-0136784; 10-2020-0136785; and 10-2020-0136788, all filed in the Republic of Korea on Oct. 21, 2020; and Patent Application No. 10-2021-0139407, filed in the Republic of Korea on Oct. 19, 2021, all of which are hereby expressly incorporated by reference into the present application.

TECHNICAL FIELD

The present disclosure relates to a magnetic element, which is capable of reducing heat generation due to inductance variation according to the configuration of a coil, and an image output device including the same.

BACKGROUND ART

Various magnetic coupling devices such as transformers or line filters, for example, coil parts, are mounted in power supply units of electronic devices.

A transformer may be included in electronic devices for various purposes. For example, a transformer may be used to perform an energy transfer function of transferring energy from one circuit to another circuit. In addition, a transformer may be used to perform a voltage-boosting or voltage reduction function of changing the magnitude of voltage. In addition, a transformer, which has characteristics in which only inductive coupling is exhibited between primary and secondary coils and thus no DC path is directly formed, may be used to block direct current and apply alternating current or to insulate between two circuits.

FIG. 1 is an exploded perspective view showing an example of the configuration of a general transformer.

Referring to FIG. 1, a general slim-type transformer 10 includes a core unit, which includes an upper core 11 and a lower core 12, and includes a secondary coil 13 and a primary coil 14, which are provided between the cores 11 and 12. In general, the secondary coil 13 is composed of a plurality of conductive metal plates, and the primary coil 14 takes the form of a wound conductive wire. In another configuration, a bobbin (not shown) may be disposed between the upper core 11 and the lower core 12.

In the transformer shown in FIG. 1, the primary coil and the secondary coil overlap each other in the vertical direction. When conductive wires are used for the secondary coil in place of the conductive metal plates, the primary coil and the secondary coil may be disposed so as to overlap each other in the horizontal direction.

However, when conductive wires are used for the secondary coil, the conductive wires need to be disposed parallel to each other when viewed in a plan view in order to realize slimness, and thus form turns around a center leg of a core unit. In this case, an inner conductive wire closest to the center leg is the shortest, and an outer conductive wire farthest from the center leg is the longest, whereby inductance variation occurs. This inductance variation causes current concentration, and the current concentration causes vigorous heat generation.

DISCLOSURE

Technical Problem

A technical task of the present disclosure is to provide a magnetic element, which has a slim structure and is capable of reducing heat generation, and an image output device using the same.

Particularly, the present disclosure provides a magnetic element, which is capable of preventing heat generation due to inductance variation caused by a length difference between conductive wires constituting a coil, and an image output device using the same.

The technical tasks of the present disclosure are not limited to the above-mentioned technical tasks, and other technical tasks not mentioned herein will be clearly understood by those skilled in the art from the following description.

Technical Solution

A magnetic coupling device according to an embodiment may include a first core, a second core disposed on the first core, a bobbin having a through-hole formed in a center portion thereof, the bobbin being at least partially disposed between the first core and the second core, and a first coil unit and a second coil unit at least partially disposed on the bobbin, wherein any one of the first coil unit and the second coil unit may include a first conductive wire and a second conductive wire disposed around the through-hole, each of the first conductive wire and the second conductive wire including a first end portion and a second end portion, wherein the bobbin may include a terminal portion formed to allow the first end portion and the second end portion of the first conductive wire and the first end portion and the second end portion of the second conductive wire to be disposed thereon and a tangled portion formed opposite the terminal portion in a horizontal direction, with the through-hole interposed therebetween, and wherein a portion of the first conductive wire and a portion of the second conductive wire may overlap each other vertically on the tangled portion.

In an example, the second coil unit may be disposed inside the first coil unit.

In an example, the first coil unit and the second coil unit may overlap each other in one direction.

In an example, the first coil unit may be composed of the first conductive wire and the second conductive wire, and the second coil unit may be composed of a metal plate.

In an example, any one of the first coil unit and the second coil unit may further include a third conductive wire and a fourth conductive wire disposed around the through-hole, each of the third conductive wire and the fourth conductive wire including a first end portion and a second end portion.

In an example, a portion of the third conductive wire may overlap a portion of the fourth conductive wire vertically.

In an example, the first conductive wire may include another portion overlapping another portion of the fourth conductive wire vertically, and the portion of the first conductive wire and the other portion of the first conductive wire may be disposed at different positions from each other.

In an example, the second conductive wire may include another portion overlapping another portion of the third conductive wire vertically, and the portion of the second conductive wire and the other portion of the second conductive wire may be disposed at different positions from each other.

In an example, the first end portion of the third conductive wire, the first end portion of the first conductive wire, the first end portion of the fourth conductive wire, the first end portion of the second conductive wire, the second end portion of the first conductive wire, the second end portion of the third conductive wire, the second end portion of the second conductive wire, and the second end portion of the fourth conductive wire may be disposed parallel to each other on the terminal portion.

In an example, a first terminal portion, in which the first end portion of the fourth conductive wire, the first end portion of the second conductive wire, the second end portion of the first conductive wire, and the second end portion of the third conductive wire are electrically short-circuited with each other, may be provided.

In an example, a second terminal portion, in which the first end portion of the third conductive wire and the first end portion of the first conductive wire are electrically short-circuited with each other, may be provided, and a third terminal portion, in which the second end portion of the second conductive wire and the second end portion of the fourth conductive wire are electrically short-circuited with each other, may be provided.

In an example, the first terminal portion may be grounded, and the second terminal portion and the third terminal portion may be connected to electrically different polarities.

In an example, the first core may include a first protruding portion protruding toward the second core, and the first protruding portion may be disposed in the through-hole in the bobbin.

In an example, the second coil unit may be disposed between the first protruding portion and the first coil unit.

In addition, an image output device according to an embodiment may include a case, a power supply unit (PSU) disposed in the case and including a magnetic coupling device, and a display disposed on one side of the case to output a received signal as an image, wherein the magnetic coupling device disposed on the power supply unit (PSU) may include a first core, a second core disposed on the first core, a bobbin having a through-hole formed in a center portion thereof, the bobbin being at least partially disposed between the first core and the second core, and a first coil unit and a second coil unit at least partially disposed on the bobbin, wherein any one of the first coil unit and the second coil unit may include a first conductive wire and a second conductive wire disposed around the through-hole, each of the first conductive wire and the second conductive wire including a first end portion and a second end portion, wherein the bobbin may include a terminal portion formed to allow the first end portion and the second end portion of the first conductive wire and the first end portion and the second end portion of the second conductive wire to be disposed thereon and a tangled portion formed opposite the terminal portion in a horizontal direction, with the through-hole interposed therebetween, wherein a portion of the first conductive wire and a portion of the second conductive wire may overlap each other vertically on the tangled portion, and wherein the first and second end portions of the first conductive wire and the first and second end portions of the second conductive wire disposed on the terminal portion may supply power to the display.

A transformer according to an embodiment may include a core unit including an upper core and a lower core, a bobbin at least partially disposed between the upper core and the lower core, and a first coil unit and a second coil unit at least partially disposed on the bobbin, wherein the bobbin may include a through-hole formed in a center portion thereof, a first portion disposed on one side of the bobbin in a first direction on the basis of the through-hole, and a second portion disposed on another side of the bobbin, the another side being opposite the first portion on the basis of the through-hole, wherein at least one of the first coil unit or the second coil unit may include a first conductive wire and a second conductive wire disposed around the through-hole, wherein one side of the first conductive wire may extend so as to be disposed on the second portion, one side of the second conductive wire may extend so as to be disposed on the second portion, another side of the first conductive wire may extend such that two ends thereof are disposed on the first portion, and another side of the second conductive wire may extend such that two ends thereof are disposed on the first portion, and wherein at least a portion of the first conductive wire and at least a portion of the second conductive wire may overlap each other on the second portion.

In an example, the first conductive wire and the second conductive wire may extend parallel to each other in the first direction on the center portion.

In an example, the first conductive wire and the second conductive wire may not overlap each other on the center portion.

In an example, the first conductive wire and the second conductive wire may have a symmetrical shape in the first direction with respect to the through-hole.

In an example, at least one of the first coil unit or the second coil unit may further include a third conductive wire forming a turn outside the first conductive wire when viewed in a plan view and a fourth conductive wire forming a turn outside the second conductive wire when viewed in a plan view.

In an example, the third conductive wire and the first conductive wire may be disposed in parallel to form a turn, and the fourth conductive wire and the second conductive wire may be disposed in parallel to form a turn.

In an example, at least one of the first coil unit or the second coil unit may further include a plurality of terminal pins disposed parallel to each other in a second direction on the first portion, and the transformer may further include a short-circuiting portion configured to short-circuit a plurality of terminal pins corresponding to grounds with each other, among the plurality of terminal pins.

A transformer according to an embodiment may include a core unit including an upper core and a lower core, a bobbin at least partially disposed between the upper core and the lower core, and a first coil unit and a second coil unit at least partially disposed on the bobbin, wherein the bobbin may include a through-hole formed in a center portion thereof, a first portion disposed on one side of the bobbin in a first direction on the basis of the through-hole, and a second portion disposed on another side of the bobbin on the basis of the through-hole, the another side being opposite the first portion, wherein at least one of the first coil unit or the second coil unit may include a plurality of conductive wires disposed around the through-hole, wherein one side of each of the plurality of conductive wires may extend so as to be disposed on the second portion, and another side of each of the plurality of conductive wires may extend such that two ends thereof are disposed on the first portion, wherein at least a portion of a first conductive wire and at least a portion of a second conductive wire among the plurality of conductive wires may overlap each other to form an overlapping portion on the second portion, and wherein the bobbin may have an opening formed in the second portion to expose at least a part of the overlapping portion.

In an example, the bobbin may include a top plate, a bottom plate, and a side wall disposed between the top plate and the bottom plate, and the opening may be formed in at least one of the top plate or the bottom plate.

In an example, the opening may have any one planar shape from among a semicircular shape, a circular shape, a track-like shape, and a polygonal shape.

In an example, the overlapping portion may include a plurality of regions respectively corresponding to overlapping pairs of the plurality of conductive wires, and the opening may expose at least some of the plurality of regions.

In an example, the planar area of the opening may be 50% to 90% of the sum of the planar areas of the plurality of regions.

In an example, the first conductive wire and the second conductive wire among the plurality of conductive wires may extend parallel to each other in the first direction on the center portion.

In an example, the first conductive wire and the second conductive wire may not overlap each other on the center portion.

In an example, the first conductive wire and the second conductive wire may have a symmetrical shape in the first direction with respect to the through-hole.

In an example, the plurality of conductive wires may further include a third conductive wire forming a turn outside the first conductive wire when viewed in a plan view and a fourth conductive wire forming a turn outside the second conductive wire when viewed in a plan view.

In an example, the third conductive wire and the first conductive wire may be disposed in parallel to form a turn, and the fourth conductive wire and the second conductive wire may be disposed in parallel to form a turn.

In an example, at least one of the first coil unit or the second coil unit may further include a plurality of terminal pins disposed parallel to each other in a second direction on the first portion, and may further include a short-circuiting portion configured to short-circuit a plurality of terminal pins corresponding to grounds with each other, among the plurality of terminal pins.

A magnetic coupling device according to an embodiment may include a lower core, an upper core disposed on the lower core, and a first coil unit and a second coil unit disposed between the lower core and the upper core, wherein one of the first coil unit and the second coil unit may include a bobbin including a through-hole and a plurality of conductive wires disposed around the through-hole, wherein the bobbin may include an overlapping portion vertically overlapping the lower core, a first portion extending from the overlapping portion, a plurality of terminal pins disposed on the first portion to allow two different end portions of each of the plurality of conductive wires to be connected thereto, and a plurality of short-circuiting portions configured to short-circuit at least one pair of the plurality of terminal pins with each other, and wherein one of the plurality of short-circuiting portions may short-circuit at least two pairs of terminal pins with each other.

In an example, the bobbin may further include a second portion extending from the overlapping portion, and at least some of the plurality of conductive wires may have portions overlapping each other in the vertical direction on the second portion.

In an example, the bobbin may have an opening formed in the second portion to expose at least a part of the portions overlapping each other in the vertical direction.

In an example, the other of the first coil unit and the second coil unit may be disposed inside the one of the first coil unit and the second coil unit, and may include a single conductive wire.

In an example, each of the plurality of short-circuiting portions may correspond to any one of an in, an out, and a ground.

In an example, the number of end portions connected to terminal pins corresponding to the ground, among different end portions of the plurality of conductive wires may be at least twice the number of end portions connected to the in or the out.

In an example, the plurality of conductive wires may be integrally formed with each other in a region except for the first portion of the bobbin.

Advantageous Effects

A magnetic element according to an embodiment is configured such that a plurality of conductive wires constituting a coil intersects each other in one region, thereby minimizing a length difference between the conductive wires.

In addition, terminal pins are short-circuited with each other, whereby inductance variation between conductive wires disposed in parallel to constitute the same turn is reduced, and therefore, heat generation is reduced.

In addition, since a bobbin has an opening formed in a region in which conductive wires intersect each other, it is possible to realize slimness.

The effects achievable through the present disclosure are not limited to the above-mentioned effects, and other effects not mentioned herein will be clearly understood by those skilled in the art from the following description.

BEST MODE

Figure 1:
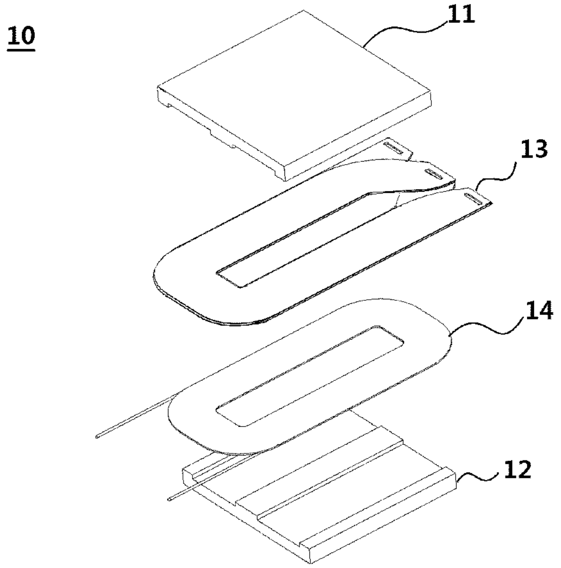
FIG. 1 is an exploded perspective view showing an example of the configuration of a general slim-type transformer.

The present disclosure will now be described more fully hereinafter with reference to the accompanying drawings, in which various embodiments are shown. The examples, however, may be embodied in many different forms and should not be construed as being limited to the embodiments set forth herein. It is to be understood that the present disclosure covers all modifications, equivalents, and alternatives falling within the scope and spirit of the present disclosure.

While ordinal numbers including "second", "first", etc. may be used to describe various components, they are not intended to limit the components. These expressions are used only to distinguish one component from another component. For example, a second element could be termed a first element, and, similarly, a first element could be termed a second element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

In the description of the embodiments, it will be understood that when an element, such as a layer (film), a region, a pattern or a structure, is referred to as being "on" or "under" another element, such as a substrate, a layer (film), a region, a pad or a pattern, the term "on" or "under" means that the element is "directly" on or under another element or is "indirectly" formed such that an intervening element may also be present. It will also be understood that criteria of on or under is on the basis of the drawing. In addition, the thickness or size of a layer (film), a region, a pattern or a structure shown in the drawings may be exaggerated, omitted or schematically drawn for the clarity and convenience of explanation, and may not accurately reflect the actual size.

The terminology used herein is for the purpose of describing particular embodiments only and is not intended to be limiting of exemplary embodiments of the disclosure. As used herein, the singular forms are intended to include the plural forms as well, unless the context clearly indicates otherwise. It will be further understood that the term "include" or "have", when used herein, specifies the presence of stated features, integers, steps, operations, elements, components, or combinations thereof, but do not preclude the presence or addition of one or more other features, integers, steps, operations, elements, components, or combinations thereof.

Unless otherwise defined, all terms used herein, which include technical or scientific terms, have the same meanings as those generally appreciated by those skilled in the art. The terms, such as ones defined in common dictionaries, should be interpreted as having the same meanings as terms in the context of pertinent technology, and should not be interpreted as having ideal or excessively formal meanings unless clearly defined in the specification.

Hereinafter, a transformer will be described in detail as an example of a magnetic coupling device according to an embodiment with reference to the accompanying drawings.

Figure 2A:
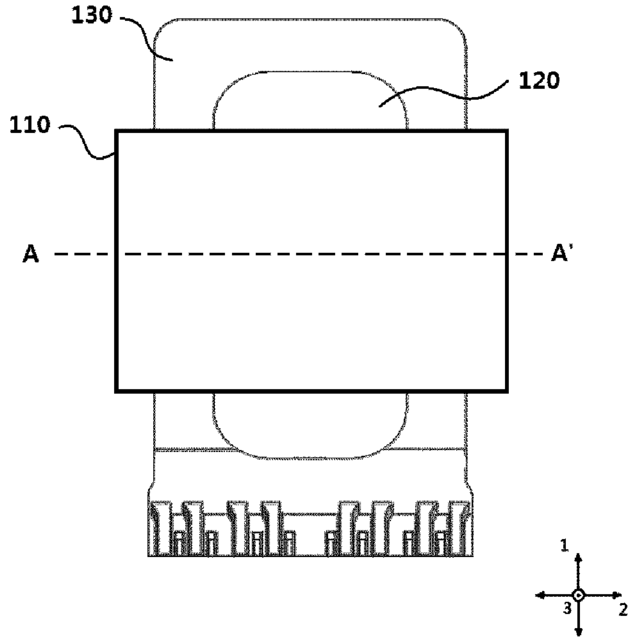
FIG. 2A is a plan view of a transformer according to an embodiment.
Figure 2B:
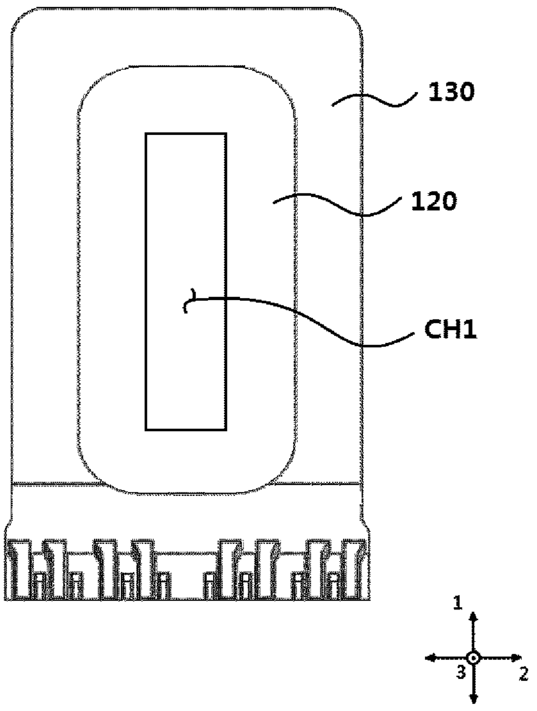
FIG. 2B is a plan view of the transformer according to the embodiment, with a core unit removed therefrom.
Figure 2C:
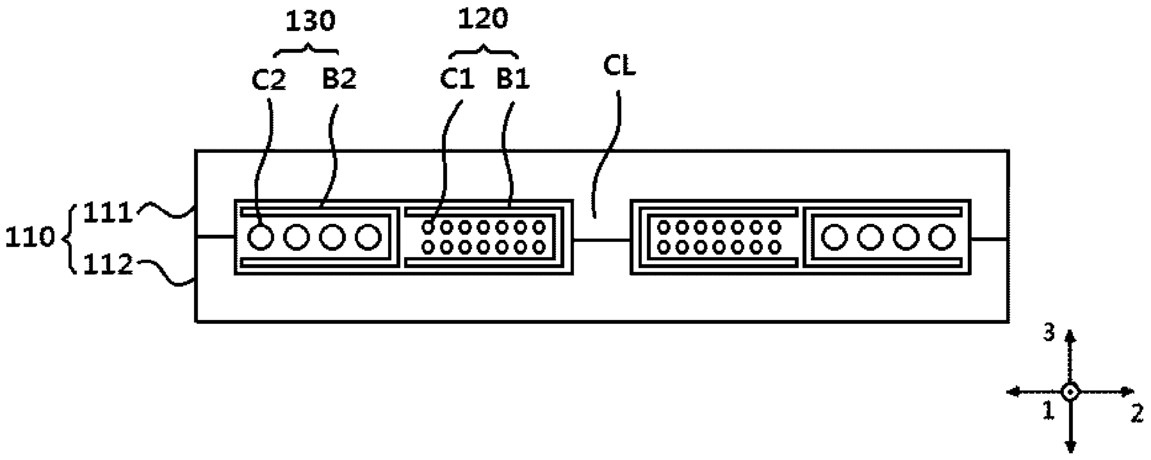
FIG. 2C is a cross-sectional view of the transformer according to the embodiment, taken along line A-A' in FIG. 2A.

FIG. 2A is a plan view of a transformer according to an embodiment, FIG. 2B is a plan view of the transformer according to the embodiment, with a core unit removed therefrom, and FIG. 2C is a cross-sectional view of the transformer according to the embodiment, taken along line A-A' in FIG. 2A.

Referring to FIGS. 2A to 2C together, a transformer 100 according to an embodiment may include a core unit 111 and 112, a first coil unit 120, and a second coil unit 130. Hereinafter, respective components will be described in detail.

The core unit 111 and 112 may have a function of a magnetic circuit, and thus may serve as a path for magnetic flux. The core unit 111 and 112 may include an upper core 111, which is disposed at an upper position, and a lower core 112, which is disposed at a lower position. The two cores 111 and 112 may be formed to be symmetrical or asymmetrical with each other in the vertical direction. However, for convenience of explanation, the following description will be given on the assumption that the two cores are formed to be vertically symmetrical with each other. In addition, the lower core 112 may be referred to as a "first core", and the upper core 111 may be referred to as a "second core".

Each of the upper core 111 and the lower core 112 may include a body portion, which has a flat plate shape, and a plurality of leg portions, which protrude from the body portion in a thickness direction (i.e. a third-axis direction) and extend in a predetermined direction. The plurality of leg portions may include two outer legs, which extend in one axis direction (here a first-axis direction) and are spaced apart from each other in another axis direction (here a second-axis direction) when viewed in a plan view, and one center leg CL, which is disposed between the two outer legs. For example, since the leg portions of the first core 112 protrude toward the second core 111, the leg portions of the first core 112 may be referred to as "first protruding portions", and since the leg portions of the second core 111 protrude toward the first core 112, the leg portions of the second core 111 may be referred to as "second protruding portions".

When the upper core 111 and the lower core 112 are coupled to each other in the vertical direction, each of the outer legs and the center leg of the upper core 111 faces a corresponding one of the outer legs and the center leg of the lower core 112. In this case, a gap having a predetermined distance (e.g. 10 to 100 μm, without being necessarily limited thereto) may be formed between at least one pair among the pairs of outer legs and the pair of center legs, which face each other.

In addition, the core unit 111 and 112 may include a magnetic material, for example, iron or ferrite, but the disclosure is not necessarily limited thereto.

The first coil unit 120 may include a first bobbin B1 having a first through-hole CH1 formed in a center thereof and a first coil C1 wound around the first through-hole CH1 in an accommodation space in the first bobbin so as to form a plurality of turns.

The second coil unit 130 may include a second bobbin B2 having a second through-hole CH2 (refer to FIG. 3) formed in a center thereof and a second coil C2 disposed around the second through-hole CH2 in an accommodation space in the second bobbin B2 so as to form a turn. Here, at least a portion of the first coil unit 120 may be disposed in the second through-hole CH2. Therefore, at least a portion of the first coil unit 120 and at least a portion of the second coil unit 130 may be overlap each other in the horizontal direction. Here, the horizontal direction may be the first-axis direction and/or the second-axis direction shown in FIG. 3. In addition, the vertical direction may be a direction perpendicular to the horizontal direction, and may be the third-axis direction shown in FIG. 3. In addition, the accommodation space in the second bobbin B2 may be defined by a top plate TP, a bottom plate BP, and a side wall SW disposed between the top plate TP and the bottom plate BP.

Each of the first coil C1 and the second coil C2 may be a multiple-turn winding in which a rigid metallic conductor, for example, a copper conductive wire, is wound multiple times in a spiral or planar spiral shape, but the disclosure is not necessarily limited thereto. For example, an enamel wire (USTC wire) wrapped by a fiber yarn, a Litz wire, a triple insulated wire (TIW), or the like may be used for the first coil C1.

In some embodiments, the first coil unit 120 may correspond to a primary coil of the transformer 100, and the second coil unit 130 may correspond to a secondary coil of the transformer 100. However, the disclosure is not necessarily limited thereto.

In addition, the diameter of the second coil C2 may be 0.7 to 0.9 times the height of the second bobbin B2 in the third-axis direction, but the disclosure is not necessarily limited thereto. Here, the height may be a length in the third-axis direction, and the height direction may have the same meaning as the thickness direction, the third-axis direction, and the vertical direction.

In addition, any one of the first coil unit 120 and the second coil unit 130 may be composed of a plurality of conductive wires, and the other may be composed of a metal plate.

A more detailed configuration of the second coil unit will be described with reference to FIG. 3.

Figure 3:
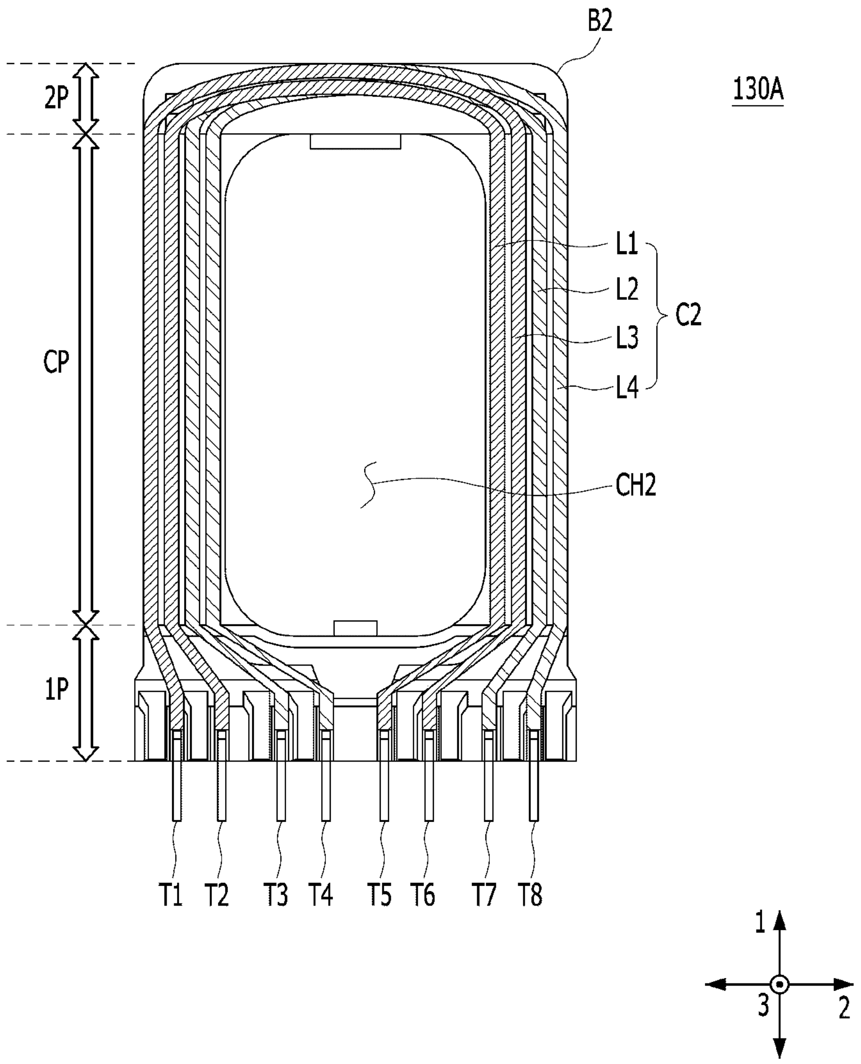
FIG. 3 is a plan view showing an example of the configuration of a second coil unit according to an embodiment.

FIG. 3 is a plan view showing an example of the configuration of the second coil unit according to an embodiment.

For convenience of explanation, FIG. 3 shows the second coil unit, with the top plate TP of the second bobbin B2 removed therefrom.

The second coil unit 130A shown in FIG. 3 may include a second bobbin B2, a second coil C2, and a plurality of terminal pins T1, T2, T3, T4, T5, T6, T7, and T8.

The second bobbin B2 may include a center portion CP, a first portion 1P, which is located on one side of the center portion CP or the second through-hole CH2 in the first-axis direction, and a second portion 2P, which is located on the other side of the center portion CP or the second through-hole CH2, which is opposite the first portion 1P in the first-axis direction.

The second through-hole CH2 may be disposed in the center portion CP, and the plurality of terminal pins T1, T2, T3, T4, T5, T6, T7, and T8 may be disposed parallel to each other in the second-axis direction on the first portion 1P. Therefore, the first portion 1P may be referred to as a “terminal portion” because the terminal pins are disposed thereon.

The second coil C2 may include a plurality of conductive wires L1, L2, L3, and L4.

Each of the plurality of conductive wires L1, L2, L3, and L4 may have two ends, each of which is electrically connected to a respective one of the plurality of terminal pins T1, T2, T3, T4, T5, T6, T7, and T8, and may form one turn around the through-hole CH2. Therefore, resistance to current applied thereto may be lowered, thereby increasing the efficiency of the transformer, and generation of heat due to resistance may be reduced, thereby suppressing generation of heat by the transformer.

For example, the two ends of the first conductive wire L1 are connected to the second terminal pin T2 and the fifth terminal pin T5, and the two ends of the third conductive wire L3 are respectively connected to the first terminal pin T1 and the sixth terminal pin T6. In addition, the two ends of the second conductive wire L2 are respectively connected to the fourth terminal pin T4 and the seventh terminal pin T7, and the two ends of the fourth conductive wire L4 are respectively connected to the third terminal pin T3 and the eighth terminal pin T8.

Meanwhile, the first conductive wire L1 and the third conductive wire L3 may intersect the second conductive wire L2 and the fourth conductive wire L4 on the second portion 2P so as to at least partially overlap the second conductive wire L2 and the fourth conductive wire L4 in the third-axis direction. In addition, the plurality of conductive wires L1, L2, L3, and L4 is disposed parallel to each other in the second-axis direction on the center portion CP, and may extend in the first-axis direction. Although illustrated in FIG. 3 as not overlapping each other in the third-axis direction on the center portion CP, the plurality of conductive wires L1, L2, L3, and L4 may partially overlap each other in the third-axis direction in a region adjacent to the second portion 2P. That is, one side of each of the plurality of conductive wires L1, L2, L3, and L4 may extend so as to be disposed on the second portion 2P, and another side thereof may extend such that the two ends thereof are disposed on the first portion 1P.

Due to the above-described configuration of the second coil unit 130, the conductive wires constituting the second coil C2 partially overlap each other on the second portion 2P. However, since each individual conductive wire forms only one turn, it can be understood that the second coil C2 is wound in one layer. The second portion 2P may be referred to as a “tangled portion” because the conductive wires overlap each other thereon.

The connection structure of the terminal pins and intersection on the second portion 2P described above are established for inductance matching between portions forming the same turn from a circuit point of view. This will be described with reference to FIGS. 4A and 4B.

Figure 4A:
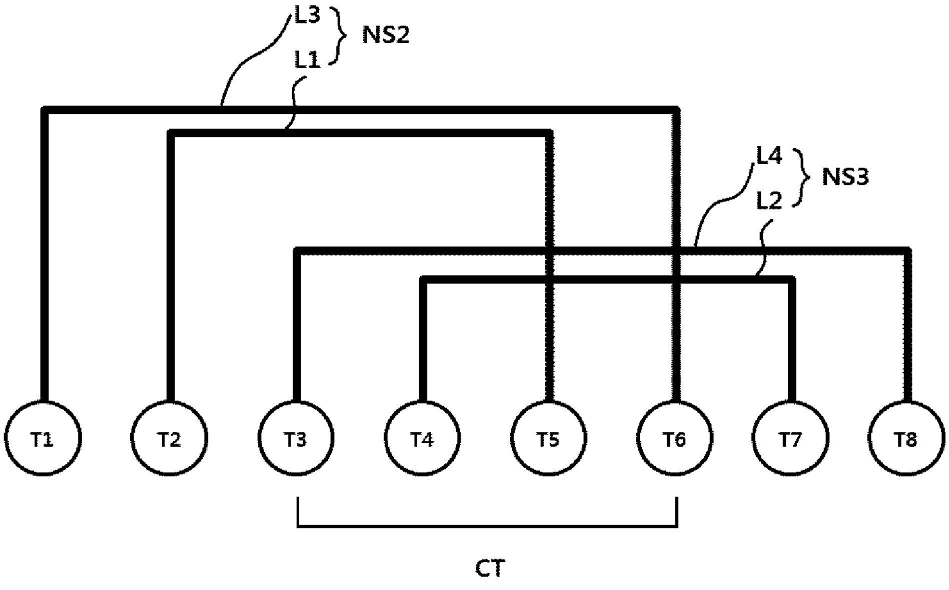
FIG. 4A illustrates a pin map of the second coil unit according to an embodiment.
Figure 4B:
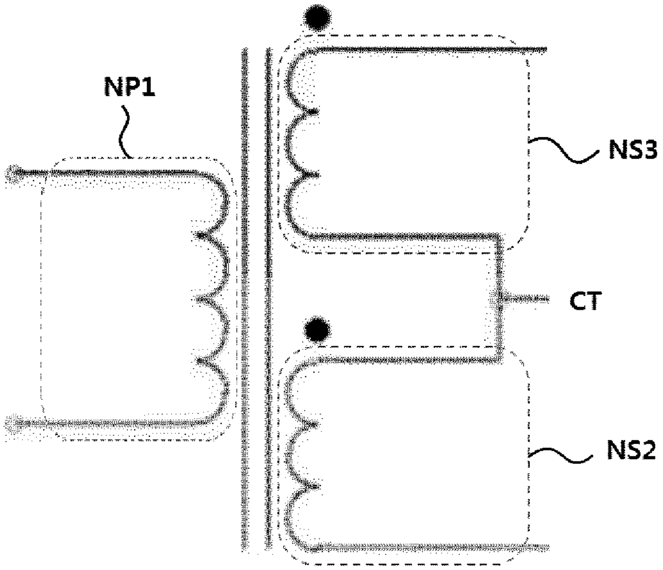
FIG. 4B is a circuit diagram of a transformer according to an embodiment.

FIG. 4A illustrates a pin map of the second coil unit according to an embodiment, and FIG. 4B is a circuit diagram of the transformer according to an embodiment.

Referring to FIGS. 4A and 4B, the first conductive wire L1 and the third conductive wire L3 are connected in parallel to each other to form a first turn portion NS2 for a first signal of the secondary coil of the transformer, and the second conductive wire L2 and the fourth conductive wire L4 form a second turn portion NS3 for a second signal of the secondary coil. In this case, the first terminal pin T1 and the second terminal pin T2 correspond to an input terminal for the first signal, and the fifth terminal pin T5 and the sixth terminal pin T6 correspond to a ground for the first signal. In addition, the seventh terminal pin T7 and the eighth terminal pin T8 correspond to an input terminal for the second signal, and the fourth terminal pin T4 and the third terminal pin T3 correspond to a ground for the second signal. Here, the grounds for the signals may be electrically connected to each other to form a so-called center tap (CT)

structure. That is, the third terminal pin T3, the fourth terminal pin T4, the fifth terminal pin T5, and the sixth terminal pin T6 may be electrically short-circuited. Here, the phrase "signals are different" may mean that the polarities thereof are electrically different.

Referring back to FIG. 3, due to the above-described connection between the conductive wires and the terminal pins, the first conductive wire L1 and the third conductive wire L3, which are disposed in parallel to constitute the first turn portion NS2, are mirror images of (symmetrical with) the second conductive wire L2 and the fourth conductive wire L4, which are disposed in parallel to constitute the second turn portion NS3, in the first-axis direction with respect to the second through-hole CH2 when viewed in a plan view. Therefore, the first turn portion NS2 and the second turn portion NS3 have substantially the same conductive wire configuration, and thus, impedance variation or inductance variation due to a length difference between conductive wires may be minimized, leading to reduction in generation of heat due to current concentration. Here, the phrase "the first turn portion NS2 and the second turn portion NS3 have substantially the same conductive wire configuration" may mean a length and/or a thickness of the conductive wires are the same. In addition, the phrase "being the same" may not necessarily refer to being completely identical. That is, a length difference or a thickness difference may range 1 to 10%, and this difference may be reduced depending on the process. That is, a length difference may be 10% or less, and a thickness difference between conductive wires may be 10% or less. However, when the difference is greater than 10%, impedance variation or inductance variation may occur, and it may be difficult to reduce generation of heat due to current concentration. That is, it is preferable to manufacture conductive wires such that the difference therebetween is 10% or less, ideally 0%. However, in practice, conductive wires may have a difference in length or thickness according to the process, and thus it is preferable that this difference between the conductive wires be 10% or less.

Meanwhile, since the conductive wires overlap on the second portion 2P, coupling force between the coils increases, whereby vibration, which is one of the major problems with a slim-type magnetic element, is reduced, and an advantage in terms of proximity effect is obtained. Specifically, if one turn is composed of multiple strands of conductors (e.g. conductive wires), a proximity effect occurs between two adjacent conductors when current flows through each conductor. That is, when current flows through a conductive wire, a magnetic field is formed in accordance with the law of electromagnetic induction. In this case, repulsive force is generated between two conductive wires when current flows therethrough in the same direction, and the current concentrates on portions that are not adjacent to each other. In the embodiment, since the directions of current flowing through the plurality of conductive wires constituting one turn are the same, cancellation occurs between two conductive wires located in the middle position when viewed in a plan view, whereby the influence of the proximity effect may be reduced due to reduction in current density.

Effects of the above-described configuration of the second coil unit 130A will be described in more detail through comparison with a comparative example with reference to FIGS. 5 to 7.

Figure 5:
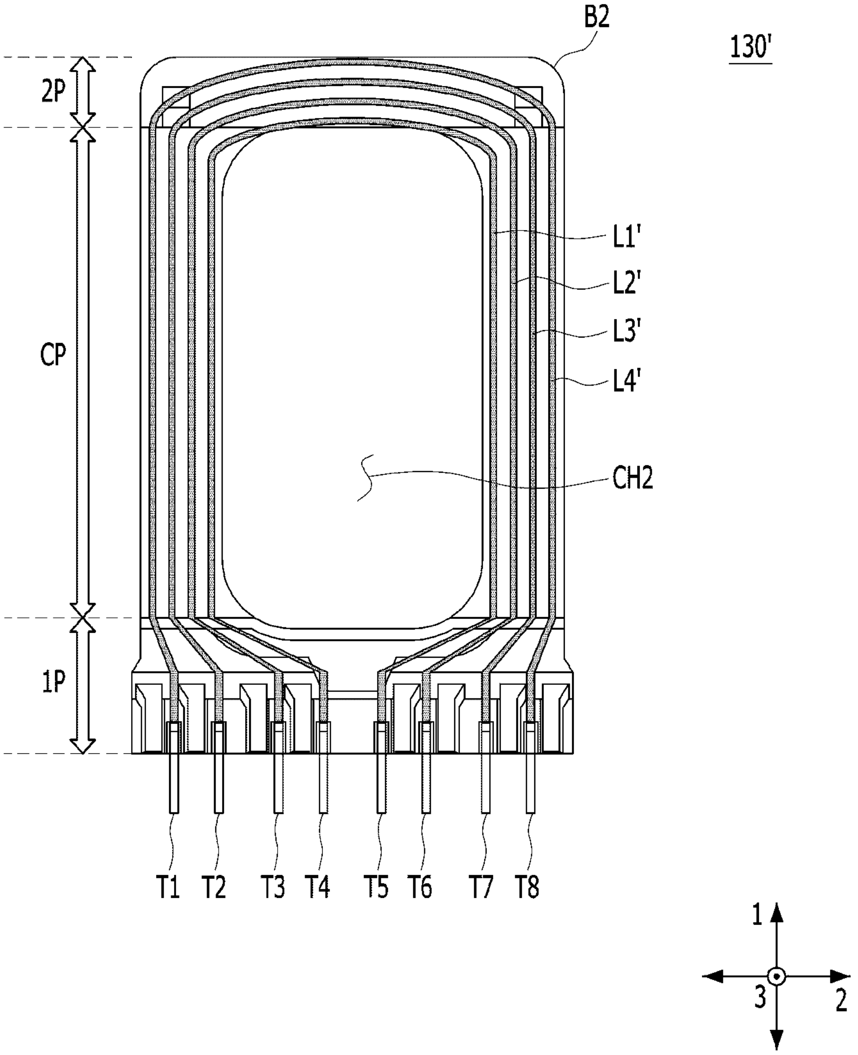
FIG. 5 is a plan view showing an example of the configuration of a second coil unit according to a comparative example.

FIG. 5 is a plan view showing an example of the configuration of a second coil unit according to a comparative example.

Referring to FIG. 5, a second coil unit 130' according to a comparative example includes a second bobbin B2 having the same configuration as the embodiment. However, a plurality of conductive wires L1', L2', L3', and L4' is disposed parallel to each other so as not to overlap each other in the third-axis direction on a second portion 2P. In this case, the first conductive wire L1' forms a turn at the innermost position, and thus has the shortest length, and the fourth conductive wire L4' forms a turn at the outermost position, and thus has the longest length.

Figure 6:
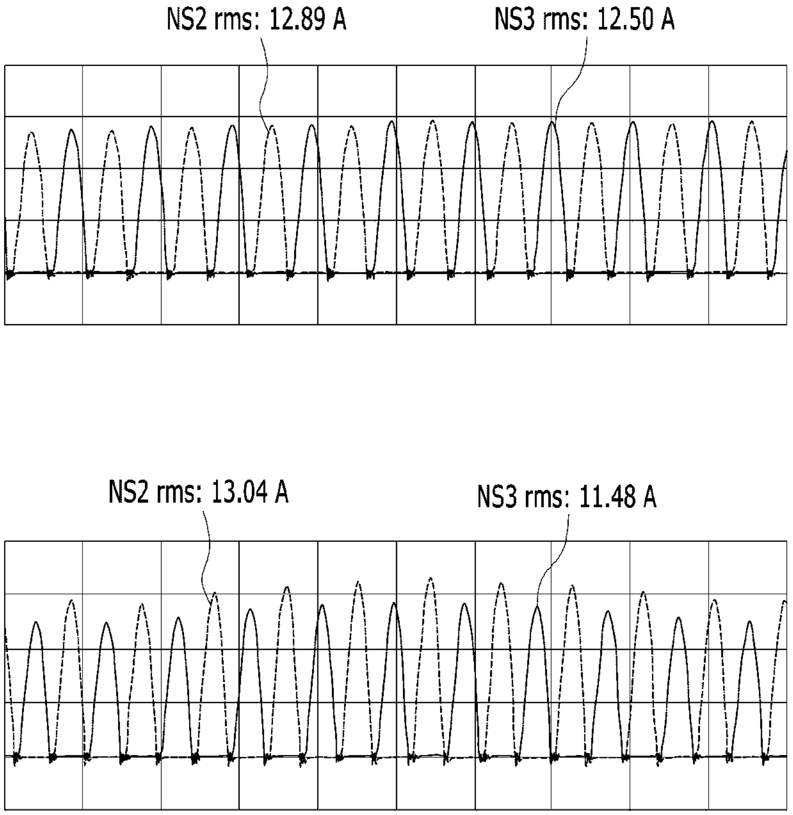
FIG. 6 shows current variations in a transformer according to an embodiment and a transformer according to a comparative example.

FIG. 6 shows current variation in the transformer according to the embodiment and the transformer according to the comparative example.

Referring to FIG. 6, graphs are shown in the upper and lower parts thereof. In each graph, the vertical axis represents current, and the horizontal axis represents time. In addition, the upper graph shows effective current rms in each turn of the second coil unit 130A according to the embodiment, and the lower graph shows effective current rms in each turn of the second coil unit 130' according to the comparative example.

First, as shown in the upper graph, since the second coil unit 130A according to the embodiment is formed such that the turn portions thereof have substantially the same conductive wire configuration, a current difference between the first turn portion NS2 and the second turn portion NS3 is only 0.39 A.

Unlike this, as shown in the lower graph, since the second coil unit 130' according to the comparative example is formed such that the turn portions thereof have different conductive wire configurations, a current difference between the first turn portion NS2 and the second turn portion NS3 reaches 1.56 A.

This current concentration causes a difference in heat generation. This will be described with reference to FIG. 7.

Figure 7:
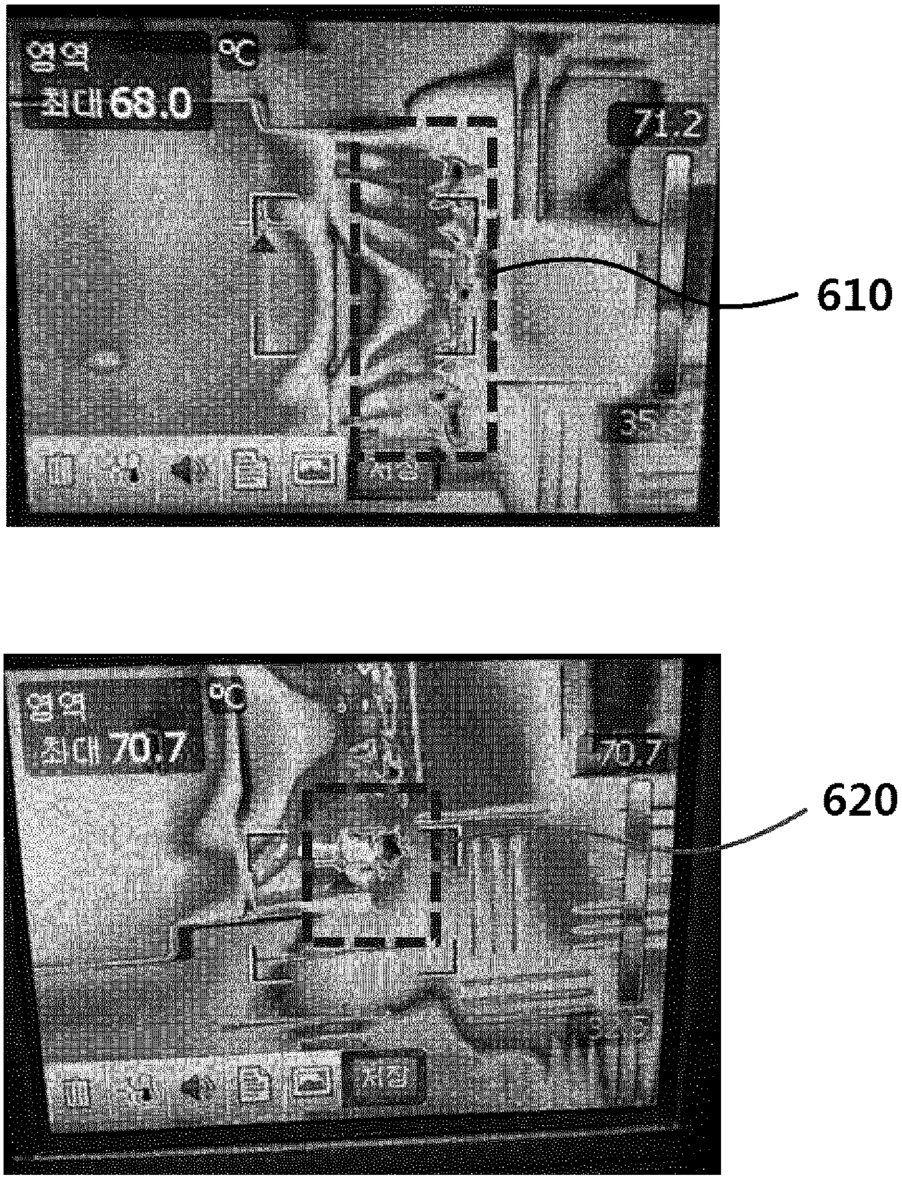
FIG. 7 shows exemplary heat generation distribution in the transformer according to the embodiment and the transformer according to the comparative example.

FIG. 7 shows exemplary heat generation distribution in the transformer according to the embodiment and the transformer according to the comparative example.

Referring to FIG. 7, an upper image is an image captured by a thermal imaging camera during operation of a transformer to which the second coil unit 130A according to the embodiment is applied, and it can be seen therefrom that the temperature over a region 610 corresponding to the first portion 1P is relatively uniform and the measured maximum temperature is about 68° C.

A lower image is an image of a transformer to which the second coil unit 130' according to the comparative example is applied, and it can be seen therefrom that current concentrates on a specific region 620 and thus the region 620 is intensively heated to a temperature up to 70.7° C., which is higher than in the embodiment.

The above-described transformer according to the embodiment has an effect of reducing inductance variation because the conductive wires for respective signals, which constitute the second coil C2 of the second coil unit 130, are symmetrical with each other. However, as shown in FIG. 3, the lengths of the conductive wires connected in parallel to each other to form a turn portion corresponding to the same signal are different from each other. For example, in the case of the first conductive wire L1 and the third conductive wire L3, which constitute the first turn portion NS2, the first conductive wire L1 is located at a position farther inward than the third conductive wire L3, and thus is relatively short. Therefore, in order to minimize this difference between the conductive wires, another embodiment of the present disclosure proposes to short-circuit the terminal pins with each other so that variation in input inductance occurring in the terminal pins is reduced in the transformer. The configuration of the second coil unit for achieving this will be described with reference to FIG. 8.

Figure 8:
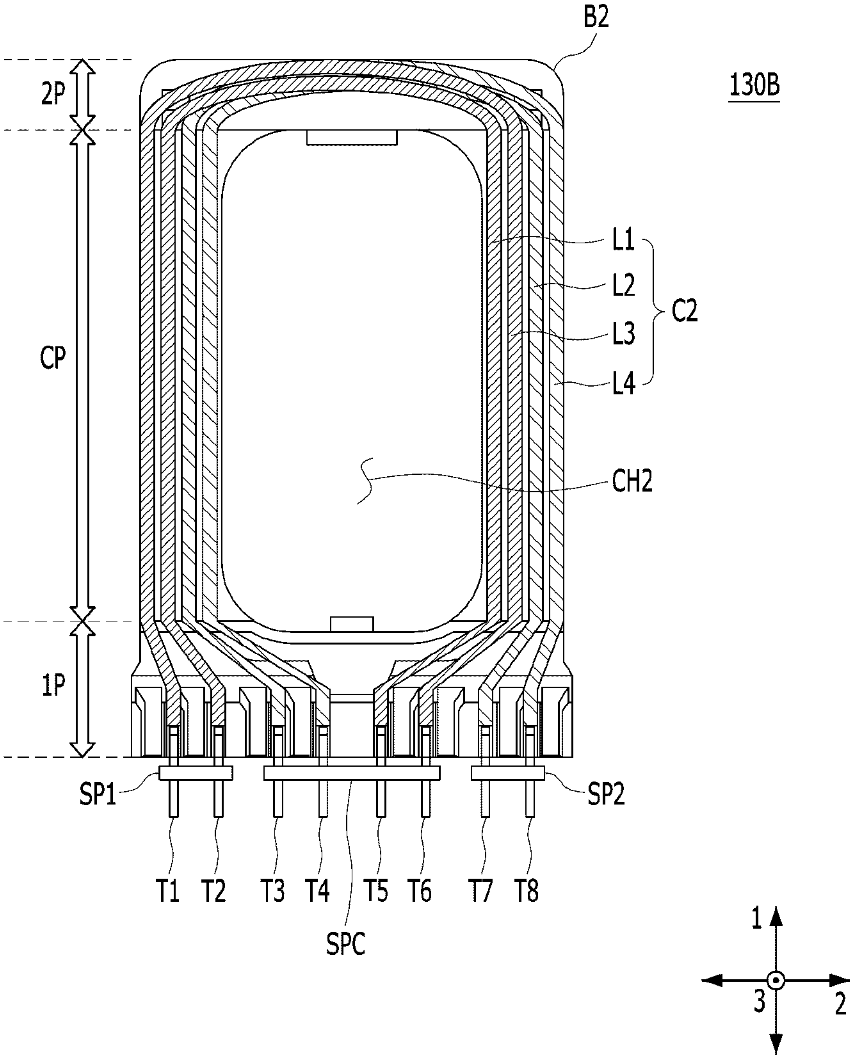
FIG. 8 is a plan view showing an example of the configuration of a second coil unit according to another embodiment.

FIG. 8 is a plan view showing an example of the configuration of a second coil unit according to another embodiment.

The configuration of a second coil unit 130B according to another embodiment shown in FIG. 8 is the same as the configuration of the second coil unit 130A according to the embodiment, except for short-circuiting portions SP1, SPC, and SP2, and thus duplicate description will be omitted.

Referring to FIG. 8, the first terminal pin T1 and the second terminal pin T2, which correspond to the input terminal for the first signal, may be short-circuited through a first short-circuiting portion SP1. In addition, the seventh terminal pin T7 and the eighth terminal pin T8, which correspond to the input terminal for the second signal, may be short-circuited through a second short-circuiting portion SP2. In addition, the third to sixth terminal pins T3, T4, T5, and T6, which correspond to the ground of the center tap configuration, may be short-circuited through a center short-circuiting portion SPC.

Here, each of the short-circuiting portions SP1, SP2, and SPC may be implemented through soldering. However, this is merely illustrative, and the disclosure is not necessarily limited thereto. Any of various schemes may be used, so long as the same is capable of short-circuiting the terminal pins. For example, each of the short-circuiting portions SP1, SP2, and SPC may be implemented through a conductive clip, a conductive pin, or a combination thereof and soldering.

Although the center short-circuiting portion SPC is illustrated in FIG. 8 as being of an integral type and short-circuiting all of the third to sixth terminal pins T3, T4, T5, and T6, a center short-circuiting portion SPC according to another aspect may include a first center short-circuiting portion (not shown) for short-circuiting the third terminal pin T3 and the fourth terminal pin T4 and a second center short-circuiting portion (not shown) for short-circuiting the fifth terminal pin T5 and the sixth terminal pin T6. In this case, the first center short-circuiting portion (not shown) and the second center short-circuiting portion (not shown) may not be physically connected to each other in the transformer. Here, "not physically connected" means that the first center short-circuiting portion (not shown) and the second center short-circuiting portion (not shown) are not directly connected to each other, but does not mean that the two elements are not electrically connected to each other via another connecting member.

Effects of the second coil unit 130B according to the other embodiment will be described with reference to FIG. 9.

Figure 9:
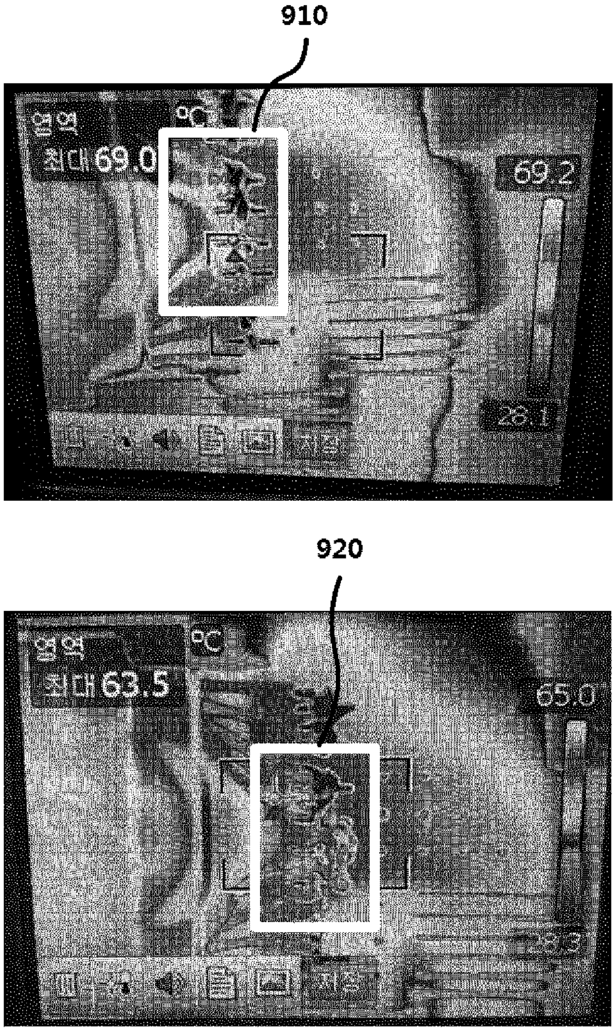
FIG. 9 shows exemplary heat generation distribution in the transformer according to the previous embodiment and a transformer according to another embodiment.

FIG. 9 shows exemplary heat generation distribution in the transformer according to the previous embodiment and the transformer according to the other embodiment.

Referring to FIG. 9, an upper image is an image captured by a thermal imaging camera during operation of a transformer to which the second coil unit 130A according to the previous embodiment is applied, and it can be seen therefrom that the terminals corresponding to the center tap are not short-circuited and therefore heat is intensively generated from a region 910 near the center tap.

A lower image is an image of a transformer to which the second coil unit 130B according to the other embodiment is applied, and it can be seen therefrom that heat generation from a region 920 near the center tap is reduced. Particularly, while the maximum temperature shown in the upper image is 69° C., the maximum temperature shown in the lower image is 63.5° C., which is lower by 5.5° C.

Results of an experiment on inductance are shown in Table 1 below.

TABLE 1

| | Intersection on Second Portion | | No Intersection on Second Portion | |
|---|---|---|---|---|
| Classification | Conductive Wire | 2nd Ls [μH] | Conductive Wire | 2nd Ls [μH] |
| No Short-Circuiting | L3 | 2.78 | L3 | 2.81 |
| Portion | L1 | 2.71 | L1 | 2.62 |
| | Δ | 0.07 | Δ | 0.19 |
| | L4 | 2.78 | L4 | 2.74 |
| | L2 | 2.71 | L2 | 2.6 |
| | Δ | 0.07 | Δ | 0.14 |
| First Center Short- | L3 | 2.71 | L3 | 2.65 |
| Circuiting Portion & | L1 | 2.7 | L1 | 2.62 |
| Second Center Short- | Δ | 0.01 | Δ | 0.03 |
| Circuiting Portion | L4 | 2.71 | L4 | 2.66 |
| | L2 | 2.71 | L2 | 2.64 |
| | Δ | 0 | Δ | 0.02 |
| Integral-type Center | L3 | 2.71 | L3 | 2.64 |
| Short-Circuiting | L1 | 2.7 | L1 | 2.62 |
| Portion | Δ | 0.01 | Δ | 0.02 |
| | L4 | 2.71 | L4 | 2.66 |
| | L2 | 2.71 | L2 | 2.65 |
| | Δ | 0 | Δ | 0.01 |

The experiment, the results of which are shown in Table 1, was conducted on a total of six cases depending on whether there was intersection between conductive wires on the second portion 2P of the second bobbin B2 and depending on the configuration of the short-circuiting portions, and inductance of each of the conductive wires L1 to L4 was measured.

That is, in the classification of Table 1, the phrase "Intersection on Second Portion" may mean a configuration in which the conductive wires intersect each other on the second portion 2P of the second bobbin B2, as shown in FIG. 3 or 8, and the phrase "No Intersection on Second Portion" may mean the configuration shown in FIG. 5. Here, the "intersection" may mean vertical overlapping. The phrase "Intersection on Second Portion" may mean vertical overlapping on a tangled portion. According to an embodiment, the phrase "Intersection on Second Portion" may mean that conductive wires do not vertically overlap each other on the terminal portion but vertically overlap each other on the tangled portion. That is, when the plurality of conductive wires is ideally identical in length and/or thickness and is disposed so as to be misaligned from each other, as shown in FIG. 8, the plurality of conductive wires may have a structure of overlapping each other vertically on the tangled portion, and accordingly, may have a structure in which the end portions of the conductive wires are disposed parallel to each other on the terminal portion. Accordingly, current concentration, inductance variation, impedance variation, and heat generation may be reduced.

In addition, the phrase "No Short-Circuiting Portion" means a configuration having no short-circuiting portion, as shown in FIG. 3 or 5, and the phrase "Integral-type Center Short-Circuiting Portion" means a configuration of the short-circuiting portion shown in FIG. 8. In addition, the phrase "First Center Short-Circuiting Portion & Second Center Short-Circuiting Portion" means a configuration in which the center short-circuiting portion SPC shown in FIG. 8 is not of an integral type but is divided into a first center short-circuiting portion (not shown) for short-circuiting the third terminal pin T3 and the fourth terminal pin T4 and a second center short-circuiting portion (not shown) for short-circuiting the fifth terminal pin T5 and the sixth terminal pin T6.

Referring to Table 1, irrespective of the presence or absence of the short-circuiting portions, inductance variation is smaller in the cases of "Intersection on Second Portion" than in the cases of "No Intersection on Second Portion". Accordingly, it can be seen that intersecting the conductive wires on the second portion to reduce a length difference between the conductive wires is effective in resolving inductance variation.

In addition, it can be seen that inductance variation is significantly lower when the short-circuiting portions are present than when the short-circuiting portions are not present and that the integral-type center short-circuiting portion provides slightly better performance than the configuration in which the first/second center short-circuiting portions are provided separately from each other.

Meanwhile, since the conductive wires intersect each other on the second portion 2P of the second bobbin B2, the conductive wires may overlap each other in the third-axis direction. Therefore, it is necessary to ensure the height of the side wall SW of the second bobbin B2 to be at least twice the thickness of the conductive wire in order to prevent deformation of the second bobbin B2 at the second portion 2P. However, ensuring the height of the side wall SW may cause the second bobbin B2 to become thick as a whole, which may increase the overall thickness of the transformer. Here, a direction defining the height or the thickness may be the vertical direction or the third-axis direction. This will be described with reference to FIG. 10.

Figure 10:
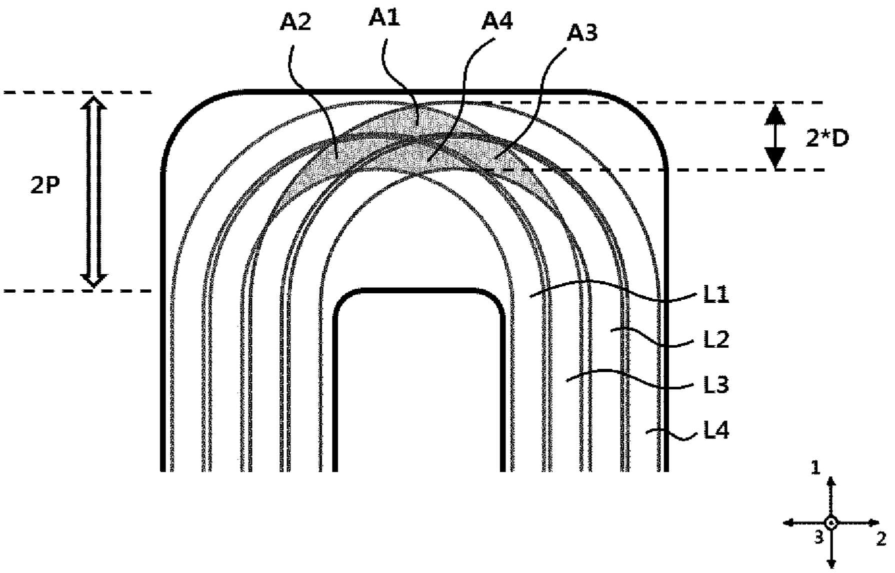
FIG. 10 is a view for explaining an overlapping pattern of conductive wires on a second portion of a second coil unit according to an embodiment.

FIG. 10 is a view for explaining an overlapping pattern of the conductive wires on the second portion of the second coil unit according to an embodiment. In FIG. 10, for better understanding, the conductive wires L1, L2, L3, and L4 are shown by solid lines regardless of overlapping.

Referring to FIG. 10, a plurality of overlapping regions is generated on the second portion 2P of the second coil unit according to the overlapping pattern of the pairs of the plurality of conductive wires. For example, a first region A1 in which the third conductive wire L3 and the fourth conductive wire L4 overlap each other vertically when viewed in a plan view, a second region A2 in which the first conductive wire L1 and the fourth conductive wire L4 overlap each other vertically when viewed in a plan view, a third region A3 in which the second conductive wire L2 and the third conductive wire L3 overlap each other vertically when viewed in a plan view, and a fourth region A4 in which the first conductive wire and the second conductive wire overlap each other vertically when viewed in a plan view are generated on the second portion 2P. The first region A1 to the fourth region A4 described above may be spaced apart from each other in the horizontal direction. The horizontal direction may mean the first-axis direction and/or the second-axis direction, and the vertical direction may mean the third-axis direction, the height direction, or the thickness direction, which is perpendicular to the horizontal direction.

These regions A1, A2, A3, and A4 require a larger accommodation space in the third-axis direction than the remaining regions.

Therefore, in still another embodiment of the present disclosure, an opening is formed in at least one of the top plate TP or the bottom plate BP in a region corresponding to the second portion 2P of the second bobbin B2 in order to prevent increase in the thickness of the second bobbin.

Figure 11A:
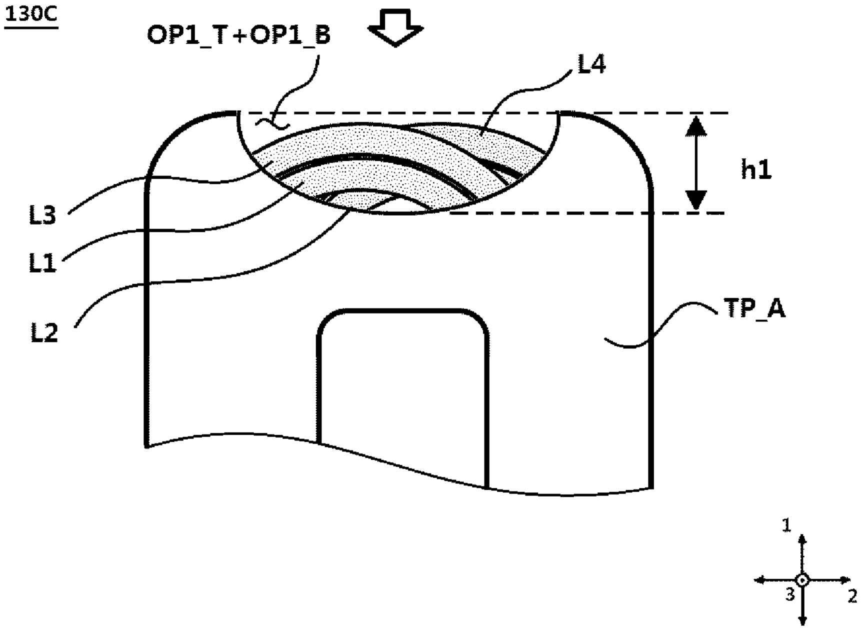
FIG. 11A is a plan view of an example of a second coil unit according to still another embodiment.
Figure 11B:
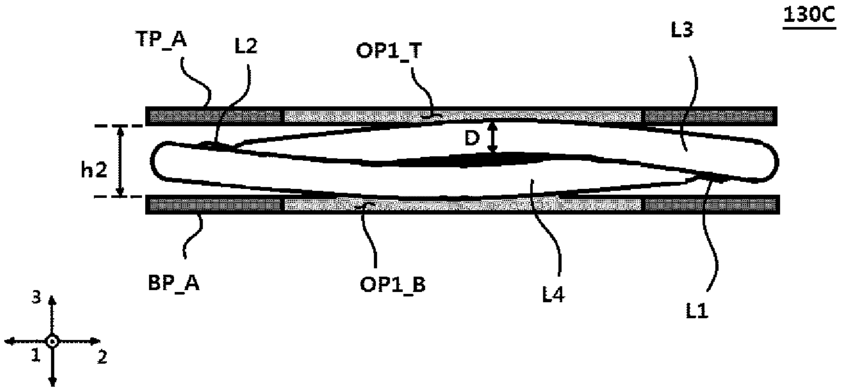
FIG. 11B is a side view of the second coil unit shown in FIG. 11A.
Figure 11C:
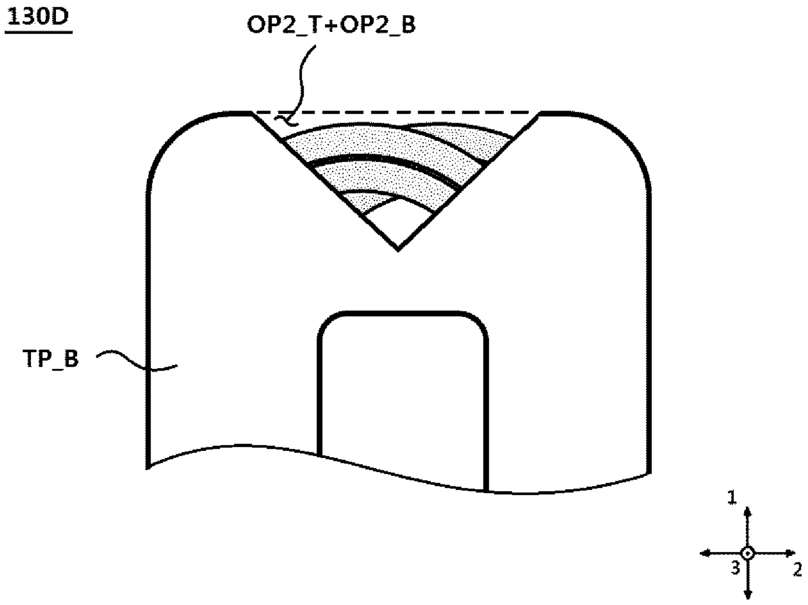
FIG. 11C is a plan view of another example of the second coil unit according to the still another embodiment.

FIG. 11A is a plan view of an example of a second coil unit according to still another embodiment, FIG. 11B is a side view of the second coil unit shown in FIG. 11A when viewed in an arrow direction in the upper part in FIG. 11A, and FIG. 11C is a plan view of another example of the second coil unit according to the still another embodiment.

Referring to FIGS. 11A and 11B together, in a second coil unit 130C according to still another embodiment, openings OP1_T and OP1_B having a semicircular planar shape are respectively formed in a top plate TP_A and a bottom plate BP_A of a second bobbin. Although the height h2 of an accommodation space (i.e. the height of a side wall SW) is less than twice the diameter D of the conductive wire, as shown in FIG. 11B, a space for intersection between the conductive wires may be secured without deformation of the bobbin due to the openings OP1_T and OP1_B. Therefore, increase in the thickness of the second bobbin may be prevented.

Meanwhile, it is preferable that the maximum length h1 of the openings OP1_T and OP1_B in the first-axis direction be greater than twice (2*D) the diameter of each conductive wire, as shown in FIG. 10. In addition, it is preferable for each of the openings OP1_T and OP1_B to be formed at a position encompassing at least a portion of each of the four regions A1, A2, A3, and A4, which are generated by overlapping between the conductive wires shown in FIG. 10. In addition, it is preferable that the planar area of each of the openings OP1_T and OP1_B be 50% to 90% of the sum of the areas of the four regions A1, A2, A3, and A4 generated by overlapping between the conductive wires, but the disclosure is not necessarily limited thereto.

In addition, the openings OP1_T and OP1_B are illustrated in FIG. 11A as having a semicircular planar shape, but this is merely illustrative. The planar shape of the openings is not limited to any specific shape, for example, a circular shape, a track-like shape, or a polygonal shape, so long as the same is capable of encompassing at least a portion of each of the four regions A1, A2, A3, and A4 generated by overlapping between the conductive wires. For example, as shown in FIG. 11C, openings OP2_T and OP2B in a second coil unit 130D may have a triangular planar shape.

Although the transformers according to the embodiments have been described above on the assumption that each of the second coil units 130, 130A, 130B, 130C, and 130D corresponds to a secondary coil of the transformer, the configuration applied to each of the second coil units 130, 130A, 130B, 130C, and 130D in order to reduce inductance variation may be applied to the first coil unit 120 or to both the first and second coil units.

In addition, as described above, the transformer 100 according to the embodiment may constitute a circuit board (not shown) constituting a power supply unit (PSU) together with other magnetic elements (e.g. an inductor).

When the magnetic coupling device having the above-described characteristics of the disclosure is used in smartphones, server computers, image output devices (e.g. TVs), IT devices for vehicles, home appliances, and vehicles, the magnetic coupling device may have a reduced thickness and may stably perform a power conversion function. When a conventional magnetic coupling device, e.g. a transformer, is used, it may be difficult to make home appliances or IT devices thin. Further, when the product is simply manufactured to be thin, there may occur a problem in that leakage inductance or leakage current is increased or power conversion efficiency is greatly deteriorated. However, the magnetic coupling device having the above-described characteristics of the disclosure may constitute, for example, a power supply unit (PSU) having a small thickness and/or a small area, thereby preventing a potential problem of deterioration in power conversion efficiency, leakage current, or leakage inductance. Therefore, it is possible to smoothly supply power to respective parts in the product, thereby reducing heat generation, increasing power conversion efficiency, and resolving a problem of leakage current or leakage inductance. For example, when a power supply unit (PSU) constituted by the magnetic coupling device having the above-described characteristics of the present disclosure is applied to image output devices (e.g. TVs), low-power image output devices (e.g. TVs), which exhibit low power consumption and have a slim structure, may be provided to consumers, and accordingly, the consumers may be promoted to buy image output devices (e.g. TVs) to which the magnetic coupling device having the characteristics of the present disclosure is applied. The above-described image output device (e.g. a TV) may include a display and a power supply unit (PSU), which are provided in a case. The embodiment may be applied as a transformer for converting power to be applied to the display, or may be applied as a high-frequency device for reducing power consumption. That is, since the display, the power supply unit (PSU), and a signal reception device are connected to the magnetic coupling device having the characteristics of the present disclosure in the case of the image output device (e.g. TV), it is possible to achieve functional integrity or technical interoperability so that the image output device (e.g. TV) having a small thickness is capable of stably operating without a problem of heat generation.

In addition, when used in IT devices, home appliances, or vehicles, the embodiment enables manufacture of a product having a smaller overall volume and stable maintenance of a function of the product, whereby the entire product and the magnetic coupling device to which the present disclosure is applied may achieve functional integrity or technical interoperability.

While the present disclosure has been particularly shown and described with reference to exemplary embodiments thereof, these embodiments are only proposed for illustrative purposes and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

The invention claimed is:

1. A magnetic element, comprising:

a first core;

a second core disposed on the first core;

a bobbin comprising a through-hole formed in a center portion thereof, the bobbin being at least partially disposed between the first core and the second core; and a first coil unit and a second coil unit at least partially disposed on the bobbin, wherein at least one of the first coil unit or the second coil unit comprises a plurality of conductive wires disposed around the through-hole, each of the plurality of conductive wires comprising a first end portion and a second end portion, wherein the bobbin comprises:

a first portion formed to allow the first end portion and the second end portion of each of the plurality of conductive wires to be disposed thereon; and a second portion formed opposite the first portion in a horizontal direction, with the through-hole interposed therebetween, wherein portions of the plurality of conductive wires overlap each other vertically on the second portion, wherein the first portion of the bobbin is disposed on one side thereof in a first direction, which is one among the horizontal direction on a basis of the through-hole, wherein the second portion of the bobbin is disposed on another side thereof, the another side being opposite the first portion on the basis of the through-hole, wherein the plurality of conductive wires includes a first conductive wire and a second conductive wire, at least a portion of the first conductive wire and at least a portion of the second conductive wire overlap each other on the second portion, and wherein the bobbin has an opening formed in the second portion to expose at least a part of a portion in which the plurality of conductive wires overlaps.

2. The magnetic element according to claim 1, wherein the first coil unit and the second coil unit overlap each other in one direction.

3. The magnetic element according to claim 1, wherein the bobbin comprises:

a top plate;

a bottom plate; and a side wall disposed between the top plate and the bottom plate, and wherein the opening is formed in at least one of the top plate or the bottom plate.

4. The magnetic element according to claim 3, wherein the opening has any one planar shape from among a semicircular shape, a circular shape, a track-like shape, and a polygonal shape.

5. The magnetic element according to claim 1, wherein an overlapping portion, in which the plurality of conductive wires overlaps each other, comprises a plurality of regions respectively corresponding to overlapping pairs of the plurality of conductive wires, and wherein the opening exposes at least some of the plurality of regions.

6. The magnetic element according to claim 1, wherein the bobbin comprises:

a plurality of terminal pins disposed on the first portion to allow two different first and second end portions of each of the plurality of conductive wires to be connected thereto; and a plurality of short-circuiting portions configured to short-circuit at least one pair of the plurality of terminal pins with each other, and wherein one of the plurality of short-circuiting portions short-circuits at least two pairs of terminal pins with each other.

7. The magnetic element according to claim 1, wherein the plurality of conductive wires of the first coil unit includes the first conductive wire and the second conductive wire, and wherein the second coil unit includes a metal plate.

8. The magnetic element according to claim 1, wherein the plurality of conductive wires further includes a third conductive wire, and a fourth conductive wire disposed around the through-hole, each of the first to fourth conductive wires including the first end portion and the second end portion.

9. The magnetic element according to claim 8, wherein a portion of the third conductive wire overlaps a portion of the fourth conductive wire vertically.

10. The magnetic element according to claim 8, wherein the first conductive wire includes another portion overlapping another portion of the fourth conductive wire vertically, and wherein a portion of the first conductive wire and the another portion of the first conductive wire are disposed at different positions from each other.

11. The magnetic element according to claim 9, wherein the second conductive wire includes another portion overlapping another portion of the third conductive wire vertically, and wherein a portion of the second conductive wire and another portion of the second conductive wire are disposed at different positions from each other.

12. A magnetic element comprising:

a first core;

a second core disposed on the first core;

a bobbin comprising a through-hole formed in a center portion thereof, the bobbin being at least partially disposed between the first core and the second core; and a first coil unit and a second coil unit at least partially disposed on the bobbin, wherein at least one of the first coil unit or the second coil unit comprises a plurality of conductive wires disposed around the through-hole, each of the plurality of conductive wires comprising a first end portion and a second end portion, wherein the bobbin comprises:

a first portion formed to allow the first end portion and the second end portion of each of the plurality of conductive wires to be disposed thereon; and a second portion formed opposite the first portion in a horizontal direction, with the through-hole interposed therebetween, wherein portions of the plurality of conductive wires overlap each other vertically on the second portion, wherein the plurality of conductive wires includes a first conductive wire, a second conductive wire, a third conductive wire, and a fourth conductive wire disposed around the through-hole, each of the first to fourth conductive wires including the first end portion and the second end portion, and wherein the first end portion of the third conductive wire, the first end portion of the first conductive wire, the first end portion of the fourth conductive wire, the first end portion of the second conductive wire, the second end portion of the first conductive wire, the second end portion of the third conductive wire, the second end portion of the second conductive wire, and the second end portion of the fourth conductive wire are disposed parallel to each other on the first portion.

13. The magnetic element according to claim 12, wherein the first end portion of the fourth conductive wire, the first end portion of the second conductive wire, the second end portion of the first conductive wire, and the second end portion of the third conductive wire are electrically short-circuited with each other to configure a first terminal portion.

14. The magnetic element according to claim 13, wherein the first end portion of the third conductive wire and the first end portion of the first conductive wire are electrically short-circuited with each other to configure a second terminal portion, and wherein the second end portion of the second conductive wire and the second end portion of the fourth conductive wire are electrically short-circuited with each other to configure a third terminal portion.

15. The magnetic element according to claim 14, wherein the first terminal portion is grounded, and wherein the second terminal portion and the third terminal portion are connected to electrically different polarities.

16. The magnetic element according to claim 6, wherein each of the plurality of short-circuiting portions corresponds to any one of an in, an out, and a ground, and wherein a number of end portions connected to terminal pins corresponding to the ground, among the different first and the second end portions of each of the plurality of conductive wires is at least twice a number of end portions connected to the in or the out.

17. The magnetic element according to claim 5, wherein a planar area of the opening is 50% to 90% of a sum of planar areas of the plurality of regions.

18. The magnetic element according to claim 1, wherein the first conductive wire and the second conductive wire do not overlap each other on the center portion.

19. An image output device, comprising the magnetic element of claim 1.

* * * * *